US009315719B2

(12) United States Patent
Fang et al.

(10) Patent No.: US 9,315,719 B2
(45) Date of Patent: Apr. 19, 2016

(54) LOW SURFACE FRICTION PROPPANTS

(75) Inventors: Christopher Y. Fang, Houston, TX (US); Dilip K. Chatterjee, Houston, TX (US); Robert D. Skala, Houston, TX (US); Christopher E. Coker, Houston, TX (US); John R. Loscutova, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 280 days.

(21) Appl. No.: 13/548,243

(22) Filed: Jul. 13, 2012

(65) Prior Publication Data
US 2013/0014945 A1 Jan. 17, 2013

Related U.S. Application Data

(60) Provisional application No. 61/507,437, filed on Jul. 13, 2011.

(51) Int. Cl.
C09K 8/80 (2006.01)

(52) U.S. Cl.
CPC .. C09K 8/80 (2013.01); C09K 8/805 (2013.01)

(58) Field of Classification Search
None
See application file for complete search history.

(56) References Cited

U.S. PATENT DOCUMENTS

| 4,303,431 A | 12/1981 | Torobin |
| 4,303,432 A | 12/1981 | Torobin |
| 4,303,433 A | 12/1981 | Torobin |
| 4,303,730 A | 12/1981 | Torobin |
| 4,303,736 A | 12/1981 | Torobin |
| 4,415,512 A | 11/1983 | Torobin |
| 4,493,875 A | 1/1985 | Beck et al. |
| 4,547,468 A | 10/1985 | Jones et al. |
| 4,637,990 A | 1/1987 | Torobin |
| 4,671,909 A | 6/1987 | Torobin |
| 4,725,390 A | 2/1988 | Laird et al. |
| 4,743,545 A | 5/1988 | Torobin |
| 4,777,154 A | 10/1988 | Torobin |
| 5,183,493 A | 2/1993 | Brandau et al. |
| 5,212,143 A | 5/1993 | Torobin |
| 5,225,123 A | 7/1993 | Torobin |
| 5,397,759 A | 3/1995 | Torobin |
| 5,420,086 A | 5/1995 | Brandau et al. |
| 5,472,648 A | 12/1995 | Alisch et al. |
| 6,197,073 B1 | 3/2001 | Kadner et al. |
| 6,528,157 B1 | 3/2003 | Hussain et al. |
| 6,528,446 B1 | 3/2003 | Stensrud |
| 6,632,527 B1 | 10/2003 | McDaniel et al. |

(Continued)

FOREIGN PATENT DOCUMENTS

| CN | 101665686 A | 3/2010 |
| GB | 2232672 A | 12/1990 |
| WO | 2007033489 A2 | 3/2007 |

OTHER PUBLICATIONS

"Particle Deposition and Aggregation", Colloidal Hydrodynamics and Transport, Chapter 4, pp. 68-109. (no date available).

(Continued)

Primary Examiner — Alicia Bland
(74) Attorney, Agent, or Firm — Craig W. Roddy; Tumey L.L.P.

(57) ABSTRACT

A proppant having low surface friction is described, which is useful in hydrocarbon recovery. Methods of making low surface friction proppants are further described, as well as uses thereof.

26 Claims, 1 Drawing Sheet

Present Invention
- $\theta = 27°$
- Static friction coefficient $\mu = \tan(\theta) = 0.51$ Comparative Proppant A
(ceramic proppant)
- $\theta = 33°$
- Static friction coefficient $\mu = \tan(\theta) = 0.65$ Comparative Proppant B
(Resin coated Sand)
- $\theta = 35°$
- Static friction coefficient $\mu = \tan(\theta) = 0.70$

(56) References Cited

U.S. PATENT DOCUMENTS

| | | | |
|---|---|---|---|
| 6,863,128 B2 | 3/2005 | Pandey et al. | |
| 6,884,509 B2 | 4/2005 | Huff et al. | |
| 7,001,872 B2 | 2/2006 | Pyecroft et al. | |
| 7,117,943 B2 | 10/2006 | Harris et al. | |
| 7,135,231 B1 | 11/2006 | Sinclair et al. | |
| 7,165,617 B2 | 1/2007 | Lord et al. | |
| 7,232,793 B1 | 6/2007 | King et al. | |
| 7,237,610 B1 | 7/2007 | Saini et al. | |
| 7,271,134 B2 | 9/2007 | King et al. | |
| 7,402,338 B2 | 7/2008 | Weintritt et al. | |
| 7,459,209 B2 | 12/2008 | Smith et al. | |
| 7,461,697 B2 | 12/2008 | Todd et al. | |
| 7,491,444 B2 | 2/2009 | Smith et al. | |
| 7,504,366 B2 | 3/2009 | Hanes, Jr. et al. | |
| 7,569,199 B1 | 8/2009 | Barron et al. | |
| 7,624,802 B2 | 12/2009 | McCrary et al. | |
| 7,654,323 B2 | 2/2010 | Alary et al. | |
| 7,666,469 B2 | 2/2010 | Weintritt et al. | |
| 7,730,948 B2 | 6/2010 | de Grood et al. | |
| 7,836,952 B2 | 11/2010 | Fripp | |
| 7,867,613 B2 | 1/2011 | Smith et al. | |
| 7,883,773 B2 | 2/2011 | Smith et al. | |
| 7,887,918 B2 | 2/2011 | Smith et al. | |
| 7,914,892 B2 | 3/2011 | Smith et al. | |
| 8,003,212 B2 | 8/2011 | Smith et al. | |
| 8,012,533 B2 | 9/2011 | Smith et al. | |
| 8,012,582 B2 | 9/2011 | Luo et al. | |
| 8,047,288 B2 | 11/2011 | Skala et al. | |
| 8,075,997 B2 | 12/2011 | Smith et al. | |
| 8,168,570 B2 | 5/2012 | Barron et al. | |
| 8,178,476 B2 | 5/2012 | Xie et al. | |
| 8,178,477 B2 | 5/2012 | Skala et al. | |
| 2004/0012105 A1 | 1/2004 | Deppe et al. | |
| 2005/0244641 A1 | 11/2005 | Vincent | |
| 2006/0063682 A1 | 3/2006 | Huq et al. | |
| 2006/0243441 A1* | 11/2006 | Cornelius de Grood et al. | 166/280.2 |
| 2006/0264332 A1 | 11/2006 | Welton et al. | |
| 2007/0036977 A1 | 2/2007 | Sinclair et al. | |
| 2007/0062699 A1 | 3/2007 | Alary et al. | |
| 2007/0131424 A1 | 6/2007 | Fripp | |
| 2008/0064614 A1 | 3/2008 | Ahrenst et al. | |
| 2008/0135245 A1* | 6/2008 | Smith et al. | 166/280.2 |
| 2008/0283243 A1* | 11/2008 | Rediger et al. | 166/276 |
| 2008/0315245 A1 | 12/2008 | Oshima | |
| 2009/0038797 A1 | 2/2009 | Skala et al. | |
| 2009/0044945 A1* | 2/2009 | Willberg et al. | 166/308.1 |
| 2009/0229827 A1 | 9/2009 | Bryant et al. | |
| 2009/0260813 A1 | 10/2009 | Anderson et al. | |
| 2010/0065271 A1 | 3/2010 | McCrary et al. | |
| 2010/0071901 A1 | 3/2010 | Luo et al. | |
| 2010/0147515 A1 | 6/2010 | Hughes et al. | |
| 2010/0193189 A1 | 8/2010 | Pershikova | |
| 2010/0200239 A1 | 8/2010 | Aften | |
| 2011/0005756 A1 | 1/2011 | Kakadjian et al. | |
| 2011/0056687 A1 | 3/2011 | Fripp | |
| 2011/0073309 A1 | 3/2011 | Borisova et al. | |
| 2011/0120719 A1 | 5/2011 | Soane et al. | |
| 2011/0146985 A1 | 6/2011 | Xie et al. | |
| 2011/0160104 A1* | 6/2011 | Wu et al. | 507/269 |
| 2011/0220355 A1 | 9/2011 | Kaufman et al. | |
| 2012/0157358 A1 | 6/2012 | Fang et al. | |
| 2012/0181020 A1 | 7/2012 | Barron et al. | |
| 2012/0190597 A1 | 7/2012 | Chatterjee et al. | |

OTHER PUBLICATIONS

"Enhancing Fracture Conductivity Through Surface Modification of Proppant", Philip D. Nguyen et al., SPE 39428. 1998, pp. 101-109.

"Proppant Placement/Transport in Fractures", Phani B. Gadde et al., The University of Texas at Austin, (no date available).

"Modifying the Proppant Surface to Enhance Fracture Conductivity" (Abstract), Brahmadeo T. Dewprashad et al., SPE International Symposium on Oilfield Chemistry, Feb. 16-19, 1999.

International Search Report and Written Opinion issued in corresponding International Patent Application No. PCT/US2012/046578, dated Jan. 31, 2013 (9 pages).

Canadian Office Action for Application No. 2,840,235 dated Nov. 12, 2015.

* cited by examiner

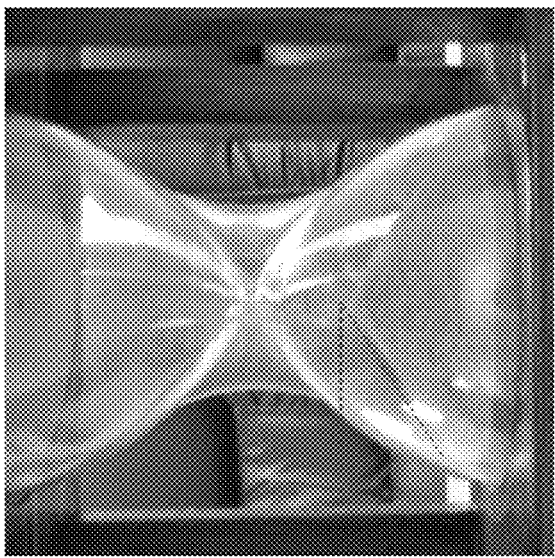
Comparative Proppant B
(Resin coated Sand)
- $\theta = 35°$
- Static friction coefficient $\mu = \tan(\theta) = 0.70$
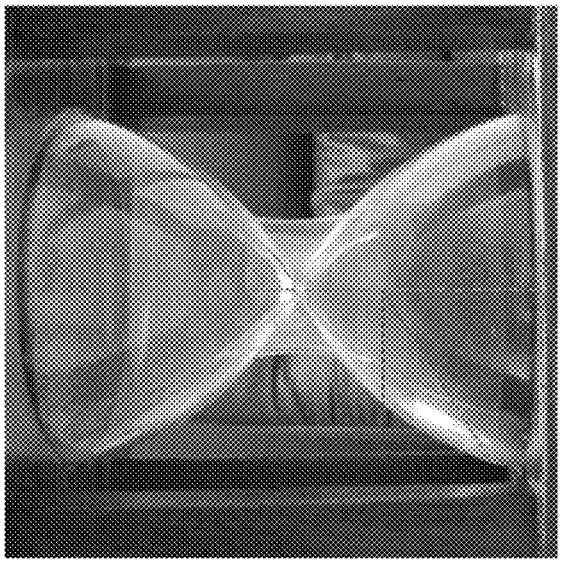
Comparative Proppant A
(ceramic proppant)
- $\theta = 33°$
- Static friction coefficient $\mu = \tan(\theta) = 0.65$
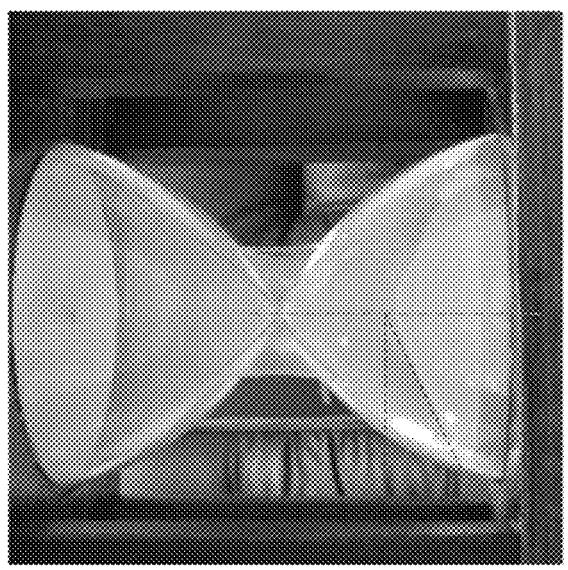
Present Invention
- $\theta = 27°$
- Static friction coefficient $\mu = \tan(\theta) = 0.51$

LOW SURFACE FRICTION PROPPANTS

This application claims the benefit under 35 U.S.C. §119 (e) of prior U.S. Provisional Patent Application No. 61/507,437, filed Jul. 13, 2011, which is incorporated in its entirety by reference herein.

BACKGROUND OF THE INVENTION

The present invention relates to proppants and the use of proppants for hydrocarbon recovery, such as in subterranean formations. The present invention further relates to identifying one or more desirable properties in a proppant and methods for screening or selecting such proppants, as well as methods to improve one or more properties in the use of proppants in treating a subterranean producing zone.

Proppants are materials pumped into oil or gas wells at extreme pressure in a carrier solution (typically brine) during the hydrofracturing process. Once the pumping-induced pressure is removed, proppants "prop" open fractures in the rock formation and thus preclude the fracture from closing. As a result, the amount of formation surface area exposed to the well bore is increased, enhancing recovery rates. Sand is the most commonly used proppant due to its availability and low cost, but sand has limitations, such as its low crush strength and agglomeration problems, settling, and the ability to achieve deep placement of the sand in the desirable locations in the well bore or fractures thereof.

Ceramic proppants are becoming widely used as propping agents to maintain permeability in oil and gas formations. High strength ceramic proppants have been used in the hydrofracture of subterranean earth in order to improve production of natural gas and/or oil. For wells that are drilled 10,000 feet or deeper into the earth, the proppant beads need to withstand 10 kpsi or higher pressure to be effective to prop the fracture generated by the hydrofracture process. Currently only proppants formed from high strength materials, such as sintered bauxite and alumina have sufficient compressive and flexural strength for use in deep wells. These conventional high strength materials are expensive, however, because of a limited supply of raw materials, a high requirement for purity, and the complex nature of the manufacturing process. In addition, such high strength materials have high specific gravity, in excess of 3.0, which is highly undesirable for proppant applications. Producing high strength proppants with low specific gravity is also a challenge. In field applications, the transportability of proppants in wells is hindered by the difference of specific gravities of proppant and carrying fluid. While light weight oxide materials, such as cordierite, have low specific gravity, they have a relatively weak flexural strength and stiffness.

In conventional proppant technology, the key parameters that were considered key for proppant success were crush strength, specific gravity, chemical resistance to the subterranean formation, the fluids used in the subterranean formation, and particle size. However, when these properties were achieved or nearly achieved, the success of the proppant in the subterranean formation still had significant room for improvement with respect to controlling settling velocity, reducing agglomeration, avoiding pressure drops in the formation, obstruction of the proppants along the well bore and walls, bridging, clogging, and the like. Thus, the inventors of the present invention realized that other key parameters of the proppant must not be present in view of these undesirable properties that were still occurring with regard to the proppant in the subterranean formation. Thus, there was a need to develop more improved proppants, methods for selecting proppants, and methods for improving one or more of the above-identified properties which were not being achieved with conventional proppants.

SUMMARY OF THE PRESENT INVENTION

A feature of the present invention is to provide a proppant that overcomes one or more of the above-identified disadvantages with conventional proppants.

A further feature of the present invention is to provide a proppant having low surface friction.

An additional feature of the present invention is to provide methods for selecting proppants that will achieve or overcome one or more of the above-identified problems with conventional proppants.

A further feature of the present invention is to provide methods for obtaining slower settling velocity, and/or lower agglomeration, and/or lower resistance to multi-phase flow, and/or lower pressure drop in the formation, and/or reduced bridging, and/or reduced clogging in the formation with regard to the proppant, and/or other advantages.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a proppant having low surface friction comprising an angle of repose of 30° or less, such as 15° to 30°.

In addition, the present invention relates to a method for selecting a proppant comprising measuring the angle of repose of the proppant and selecting said proppant if the angle of repose is 30° or less, such as from 15° to 30°.

The present invention also relates to achieving a slower settling velocity of the proppant in a transport fluid or carrying fluid comprising utilizing a proppant having an angle of repose of 30° or less.

Also, the present invention relates to a method for achieving a lower agglomeration of proppant comprising utilizing a proppant having an angle of repose of 30° or less.

Further, the present invention relates to a method of achieving lower resistance to multi-phase flow in a subterranean formation comprising utilizing a proppant having an angle of repose of 30° or less.

Further, the present invention relates to a method to achieve lower pressure drop in a subterranean formation comprising utilizing a proppant having an angle of repose of 30° or less.

Also, the present invention relates to a method to reduce bridging and/or clogging of the proppant in a subterranean formation comprising utilizing a proppant having an angle of repose of 30° or less.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

BRIEF DESCRIPTION OF DRAWINGS

FIG. 1 are three images of an angle of repose measurement for three proppant powders, and also shown are the hourglasses used.

DETAILED DESCRIPTION OF THE PRESENT INVENTION

The present invention relates to proppants having improved properties, such as low surface friction characterized by an angle of repose of 30° or less. The present invention further relates to methods to use such proppant in hydrocarbon recovery, such as gas and/or oil recovery.

The present invention further relates to methods to select proppants based on proppants having low surface friction, as well a methods to improve various properties associated with proppants, such as, but not limed to, obtaining lower settling velocity of the proppant, lower agglomeration of the proppant, lower resistance of the proppant to multi-phase flow, lower pressure drop in the formation during use of the proppant, reduced bridging, and/or reduced clogging of the proppant in the subterranean formation.

In more detail, the present invention relates, in part, to a proppant having low surface friction. A proppant having low surface friction can be tested, for instance, by having an angle of repose of 30° or less. For instance, the angle of repose can be 15° to 25°, 15° to 22°, 20° to 25°, 25° to 30°, or have other angles of repose. For purposes of the present invention, the angle of repose was determined as follows.

A plastic hourglass device with a 4 mm orifice was used for the testing and was obtained from Oriental Trading (China) as Product No. IN-59/051, and was described as a jumbo 3-minute classroom timer. The height from the bottom of the 4 mm orifice to where the proppant lands is 72.5 mm and the bottom of the diameter of the hourglass is 102 mm. In this testing for angle of repose, 100 ml (volume) of the proppant to be tested is introduced into the hourglass device and the floor on which the hourglass will be placed is level. The hourglass device is then inverted, such that the proppant material is allowed to pour through the orifice of the hourglass device. As shown in FIG. 1, the resultant mound is formed and can be measured for the angle of repose, which is the angle formed by the mound as shown in FIG. 1, which shows a 22° angle of repose as an example. The static coefficient of friction can also be calculated by taking the tangent of the angle measured.

A proppant having low surface friction, such as an angle of repose of 30° or less, is achievable by a variety of means. For instance, the proppant can be spherical or nearly-spherical. For instance, the proppant can have a Krumbein sphericity of at least 0.9 and/or a roundness of at least 0.8. The term "spherical" can refer to roundness and sphericity on the Krumbein and Sloss Chart by visually grading 10 to 20 randomly-selected particles. For purposes of the present invention, the sphericity and roundness numbers are based on an average of 20 randomly-selected proppant particles.

Further, the proppant having low surface friction can be further accomplished by having a particle size distribution that is tight. The proppant can have a tight particle size distribution (PSD) such that the proppant has a $d_{ps}$ from about 0.001 to about 0.4, wherein $d_{ps}=(d_{p90}-d_{p10})/d_{p50}$ and wherein $d_{p10}$ is a particle size (or proppant size) wherein 10% of the particles have a smaller particle size, $d_{p50}$ is a median particle size wherein 50% of the particles have a smaller particle size, and $d_{p90}$ is a particle size wherein 90% of the particles have a smaller particle size. The $d_{ps}$ can be from 0.001 to about 0.3, or from 0.001 to 0.4, or from 0.001 to 0.01, or from 0.005 to 0.4, or from 0.01 to 0.4, or from 0.05 to 0.4, or from 0.075 to 0.4, or from 0.1 to 0.4, or from 0.001 to 0.25, or from 0.001 to 0.15, and the like.

The proppant can have any particle size. For instance, the proppant can have a particle diameter size of from about 100 μm to 1 cm or a diameter in the range of from about 100 micron to about 1 mm, or a diameter of from about 100 microns to about 10000 microns, or a diameter of from about 200 microns to about 2000 microns. Other particle sizes can be used. Further, the particle sizes as measured by their diameter can be above the numerical ranges provided herein or below the numerical ranges provided herein.

Any of the proppants of the present invention can have a crush strength sufficient for serving as a proppant to prop open subterranean formation fractures. For instance, the crush strength can be 1,000 psi or greater, 3,000 psi or greater, greater than 4000 psi, greater than 9000 psi, or greater than 12000 psi. Suitable crush strength ranges can be from about 3000 psi to about 15000 psi, or from about 5000 psi to about 15000 psi, and the like. In some applications, like coal bed methane recovery, a crush strength below 3000 psi can be useful, such as 500 psi to 3000 psi, or 1000 psi to 2,000 psi. The proppant can have any of the crush strengths mentioned above, such as 5000 psi to 10,000 psi, 10,000 psi to 15,000 psi, as well as crush strengths above and below these ranges. For purposes of the present invention, crush strength is determined according to API Practice API RP 60 ($2^{nd}$ Ed. December 1995).

The proppants of the present application can, for instance, have a specific gravity of from about 0.6 to about 2.5. The specific gravity can be from about 1.0 to about 1.3 g/cc or can be from about 0.9 to about 1.5, or can be from 1.0 to 2.5, or from 1.0 to 2.4, or from 1.0 to 2.3, or from 1.0 to 2.2, or from 1.0 to 2.1 g/cc, or 1.0 g/cc to 2.0. Other specific gravities above and below these ranges can be obtained.

The proppant can have a coefficient of thermal expansion (CTE at from 25° C. to 300° C.) of from about $0.1\times10^{-6}$/K to about $13\times10^{-6}$/K; and/or a thermal conductivity of from about 0.01 W/m-K to about 3.0 W/m-K.

For purposes of the present invention, the proppant can comprise a variety of one or more materials. For instance, the proppant can comprise one or more ceramic components or can be considered a ceramic proppant. The proppant can contain or be formed from one or more natural materials, such as sand, mineral(s), plant material, seed material, tree material, or combinations thereof.

The proppant can be solid, hollow, or have a hollow central void within the proppant, and/or have one or more voids uniformly or non-uniformly distributed throughout the proppant present in certain regions of the proppant, and/or the proppant can be porous.

In the present invention, the proppant can be or can contain a ceramic material. The ceramic material can comprise an oxide, such as an oxide of aluminum, and/or an oxide of one or more other metals. The ceramic material can comprise an aluminate. For instance, the aluminate can be an aluminate of calcium, yttrium, titanium, lanthanum, barium, or silicon, or any combinations thereof, and/or other elements that can form aluminates.

The proppant can contain or include a mixture of aluminum oxide and silicon oxide. The proppant can contain or include aluminum oxide, silicon oxide, zirconium oxide, magnesium oxide, or any combination thereof. The proppant can contain or include xerogel, pumice, envirospheres, perlite, vermiculite, or fired template spheres.

The surface friction of the proppant for purposes of the present invention can be controlled or reduced, for instance, in an aqueous environment, for instance, when contained in a transport or carrying fluid, by forming a lubricant layer or layers on the most exterior surface of the proppant that comes in contact with the transport fluid or carrying fluid. The most external layer that has the lubricant layer can be considered the lubricious phase. The lubricant layer can be firmly adhered to the surface of the proppant to prevent washing off during transport in the transport fluid. The lubricant layer can contain or be a layer that contains graphite, molybdenum disulphide, boron nitride, tungsten disulphide, hexagonal boron nitride, and/or any solid material with a lamellar-type crystal structure that can have weak bonding between the lamellar. Additional examples include carbon particles, such as ultrafine carbon particles (e.g., a size of 1 nm to 100 nm). Carbon particles can have weak inter-particle bonding that may be useful as the lubricant layer. The lubricant layer can be placed on the proppant through a variety of techniques, such as, but not limited to, pressure infiltration, electrostatic deposition, in-situ formation, and/or direct spray applications. The lubricant layer can cover the entire or nearly entire surface area of the proppant's exterior surface, such as at least 70%, at least 75%, at least 80%, at least 85%, at least 90%, at least 95%, at least 99% (by surface area) of the proppant's exterior exposed surface.

With respect to pressure infiltration, the proppant can be immersed in a mixture of solid lubricant phase and carrier solvent and pressure can be applied to the mixture such that the solid lubricant particles are forced into the surface pores/cavities of the proppant.

With regard to electrostatic deposition, the proppant and solid lubricant particles that form the lubricant layer can be electrically charged with opposite polarities. The electrostatic interactions cause the deposition of a thin layer of solid lubricant particles onto the surface of the proppant. The thickness of the lubricant layer can be controlled by the degree of surface charge and process time. An optional heat treatment can be used afterwards to enhance the bonding or attachment of the solid lubricant phase to the proppant surface and reduce the effects of possible lubricant delamination and/or spalling.

With regard to in-situ formation, the proppant surface can first be coated and saturated with a liquid that contains the lubricant-forming layer, such as a carbon-rich liquid compound (e.g., hydrocarbon-based oil). The proppant that is coated with the material that forms the lubricant layer can then be heat-treated in a reducing atmosphere to partially combust the carbon-rich phase, leaving behind a thin coating. For instance, when a carbon-rich liquid compound is used, the heat treating can provide a coating of fine carbon particles.

With regard to direct spray applications, the proppant can be coated by a spray process, wherein the material that forms the solid lubricant layer is present in a carrier solvent (aqueous or organic) and applied by spray process techniques. The carrier can then be evaporated away from the surface of the proppant and the proppant can then undergo, as an option, heat treatment to enhance the bonding of the solid lubricant phase to the proppant surface.

Applying or forming one or more lubricant layers on the surface of the proppant can lead to a low surface friction proppant such that the angle of repose is 30° or less. When more than one lubricant layer is present, the lubricant layer can be the same or different from each other and can be formed by the same or different techniques. The overall thickness of the lubricant layer can be from about 0.1 micron to about 1.0 microns, such as from about 0.5 micron to about 100 microns. This overall thickness can be a result of one lubricant layer or two or more lubricant layers formed on the surface of the proppant.

As another option, if the proppant is a sintered proppant, the lubricant layer can be formed prior to sintering or as a post-sintering treatment. The lubricant layer can be adhered or attached to the surface of the proppant through thermal treatment, flame treatment, or the like. The lubricant layer can be one or more polymer layers that can be applied through polymer solution spray coating techniques. As an option, the polymer that is part of the lubricant layer can be cured onto the surface of the proppant, such as by infrared or ultraviolet curing or other curing techniques.

The polymer that can be or be part of the lubricant layer can be a thermoplastic or thermoset polymer.

Another way to achieve lower surface friction is to subject the proppants to one or more polishing processes. For instance, the proppants can be subjected to polishing or tumbling to make the surface of the proppant smoother. This can be achieved in a planetary mill or other mill. With polishing, the surface roughness of the proppant can be reduced and it has been discovered that this can reduce the surface friction of the proppant. This process is especially effective with a ceramic exterior surface. Further this process and any of the processes described herein for lowering surface friction can be especially effective when the proppant has a Krumbein sphericity of at least 0.8 or at least 0.9.

As indicated above, a key goal with proppants is to provide a proppant that has an acceptable settling velocity, low agglomeration, lower resistance to multi-phase flow, lower pressure drop in the formation when used, lower amount of proppants that are obstructed by walls (e.g., rough walls) so that more proppant reaches the deeper surface or surface further away from the well bore, and/or less chance of bridging and/or less clogging and/or deeper transport of the proppant in areas away from the well bore, and/or greater proppant fracture areas.

In order to achieve these key properties and without undue experimentation at the actual well site, part of the present invention involves the ability to determine one or more key properties that accurately predicts a proppant's performance when the proppant is actually introduced into the subterranean formation. One key property that accurately predicts the proppant's performance is a proppant's surface friction, for instance, as determined by the angle of repose as described herein. By having a proppant having a low surface friction, such as an angle of repose of 30° or less, this accurately predicts the proppant's performance with regard to one or more of the above-identified properties. When the angle of repose is greater than 30°, such as 30° or greater, 35° or greater, 40° or greater, 45° or greater, or 50° or greater, a noticeable decline in one or more of the advantageous properties is seen. In other words, when a proppant has an angle of repose of over 30°, the settling velocity is faster, the agglomeration is more, there is more resistance to multi-phase flow, there is more pressure drop in the formation, there is a larger amount of proppants that are obstructed by walls, less proppant reaches fracture areas further away from the well bore, there is more bridging and/or more clogging of the proppant in the subterranean formation, and/or the proppant fracture area is less. One or more of these negative properties are seen when the angle of repose is over 30°.

Thus, the present invention relates, in part, to a method for selecting a proppant which involves determining the surface friction of the proppant, such as by measuring the angle of repose. Further, the method can include determining if the angle of repose is 30° or less and, if so, such proppant is selected over other proppants having a higher angle of repose, such as ones over 30°. Thus, the present invention provides a method to select or screen desirable proppants that stand a much higher likelihood of achieving desirable proppant performance in the well bore as explained herein. Further, the present invention relates to a method for obtaining slower settling velocity; and/or achieving lower agglomeration (e.g., in the carrier fluid or in the subterranean formation); and/or lower resistance to multi-phase flow; and/or lower pressure drop in the formation; and/or reduced bridging and/or reduced clogging by utilizing one or more proppants having low surface friction, such as determined by an angle of repose of 30° or less, such as from 15° to 30°, from 15° to 22°, from 20° to 25°, from 20° to 30°, or other ranges therein.

As an example, a comparative proppant can have a very similar specific gravity, roundness, and sphericity, and yet have a higher surface friction, and with this difference, the performance of the proppant is significantly different.

Thus, the present invention provides the ability for a user of proppants and a proppant manufacturer to accurately predict a proppant's performance, and the present invention further permits the ability for a proppant user or manufacturer to design and/or select proppants that have a higher likelihood of achieving one or more of the beneficial properties mentioned herein with regard to proppant performance in a subterranean formation. In addition, the present invention relates to a key characteristic of proppants, namely low surface friction or an angle of repose that provides the ability for proppant users and/or manufacturers to better understand the proppant being used and to understand expected performance in subterranean formation.

Set forth below are examples of proppants, characteristics, parameters, properties, or combinations thereof that may be present. These are merely examples of additional characteristics that can be present. Any one or more of these features can be present as part of the low surface friction proppant.

The proppant can have one or more voids in the proppant, wherein the one or more voids amount to at least 20% void volume (or at least 30% void volume) in the proppant, wherein the percent is based on the entire volume of the proppant. The void volume can be from 1% to 40%, or from 5% to 40%, or from 10% to 40% or more, or from 20% to 30%, or from 25% to 30%) or from 28% to 30%.

The proppant can comprise a template sphere having at least one void within the interior of the template sphere. The template sphere can have a Krumbein sphericity of at least about 0.8 and a roundness of at least about 0.8. The overall proppant can have a Krumbein sphericity of at least about 0.8 and a roundness of at least about 0.8, and a continuous sintered shell around the entire outer surface of the template sphere. The shell can comprise a ceramic material or oxide thereof. The template sphere can comprise a material capable of withstanding sintering. The continuous shell can have a thickness of from about 5 microns to 300 microns. The template sphere can have a specific gravity of 0.2 to about 1.5. The proppant can have a crush strength of about 1,500 psi or greater, and the template sphere can have a void volume % of at least 30%. The continuous shell can have a substantially uniform thickness.

The proppant can have a void volume % of from 1% to 40%, or 15% to 40%, or 20% to 30%.

The proppant and/or template sphere (if present) can have one central void.

The proppant or template sphere can have one central void and multiple voids throughout the proppant or template sphere.

The shell (if present) can comprise two or more layers. One of the layers can comprise ceramic material or oxide thereof. At least one layer of the shell can comprise a resin layer or polymer layer. The resin layer or polymer layer can be the outermost layer comprising the shell.

The template sphere (if present) can have a crush strength of 100 psi to 1,000 psi and the proppant can have a crush strength of at least 2,500 psi.

The proppant or shell (if present) can comprise at least one reinforcement material. The reinforcement material can be a fiber, whisker, filler, or any combination thereof. The reinforcement material can be carbon black, fiberglass, carbon fibers, ceramic whiskers, ceramic particulates, hollow spheres, solid spheres, resin material, metallic particles, or any combination thereof.

The proppant or shell (if present) can comprise a metal carbide, metal nitride, or any combination thereof. The proppant or shell (if present) can comprise a zirconium oxide, a zirconium carbide, a zirconium nitride, or any combination thereof. The proppant or shell (if present) can comprise aluminum oxide, silicon oxide, magnesium oxide, calcium oxide, cerium oxide, yttrium oxide, scandium oxide, titanium dioxide, or any combination thereof.

The proppant or shell (if present) can comprise a metal oxide, a metal carbide, a metal nitride, or any combination thereof, derived from a silicon source, titanium source, tungsten source, zirconium source, aluminum source, boron source, or any combination thereof.

The proppant or shell (if present) can be surface modified, such as with the addition of silicon oxide, sodium oxide, potassium oxide, calcium oxide, zirconium oxide, aluminum oxide, lithium oxide, iron oxide, cordierite, spinel, spodumene, steatite, a silicate, a substituted aluminosilicate clay or any combination thereof.

The proppant or shell (if present) can be surface modified by applying at least one organic material to the shell.

The proppant or shell (if present) can comprise multiple layers, wherein one of the layers can comprise a metal nitride or metal carbide or both.

The proppant can have a glazing layer that can be present, and, for instance, can be present on said template sphere (if present) and can be in immediate contact with the template sphere.

The glazing layer can comprise silica, mullite, spodumene, silicon oxide, sodium oxide, potassium oxide, calcium oxide, zirconium oxide, aluminum oxide, lithium oxide, iron oxide, cordierite, spinel, steatite, a silicate, a substituted alumino silicate clay or any combination thereof.

At least a portion of the glazing layer can penetrate or infiltrate below the surface of the proppant or template sphere (if present).

The proppant can have one, or more, or all of the following characteristics:
  (a) an overall diameter of from about 90 microns to about 1,600 microns;
  (b) spherical;
  (c) a shell having voids or is porous or non-porous;
  (d) the proppant has a crush strength of about 1,000 psi or greater;
  (e) a coating(s) that has a wall thickness of from about 15 to about 120 microns; and
  (f) proppant having a specific gravity of from about 0.9 to about 3.

The proppant or shell (if present) can comprise one or more layers. One or more layers can comprise a fugitive phase or hollow material or both. The fugitive phase or hollow material or both can be present uniformly throughout the layer(s).

The proppant or shell (if present) can comprise two or more layers. At least two layers can contain a fugitive phase material or a hollow material or both. The fugitive phase material or hollow material or both are the same or different in each layer. The two or more layers can comprise at least an outer layer and an inner layer, wherein the outer layer has a higher amount of said fugitive phase material and/or hollow material compared to the inner layer.

The two or more layers can comprise at least an outer layer and an inner layer, wherein the outer layer has a higher amount of the fugitive phase material and/or hollow material compared to the inner layer and the outer layer has a higher amount of the fugitive phase material and/or hollow material compared to the template sphere, when present. The layer can comprise from about 0.5% to about 15% by volume of the fugitive phase material and/or hollow material. The layer can comprise from about 15% to about 25% by volume of the hollow material when the diameter size of the hollow material is from 0.1 to 0.2 microns. The layer can comprise from about 15 volume % to about 80 volume % of the fugitive phase material and/or hollow material. The template sphere can comprise fugitive phase material and/or hollow material in an amount of from about 0.1 volume % to about 15 volume %. The template sphere can comprise fugitive phase material and/or hollow material in an amount of from about 15 volume % to about 80 volume %.

The proppant or shell (if present) can comprise a coating layer to fill in at least a portion of any pores or voids that are present on the proppant or on a layer comprising a shell or surface of the template sphere.

Any reinforcement material can be surface treated by a thermal treatment, densification, surface modification, coating, glazing, mechanical treatment, chemical treatment, a direct particle deposition from a slurry containing precursor particles, preferential dissolution of one or more species on the particulates or components, or spark discharge treatment, or any combination thereof.

The proppant can comprise a template sphere, with the template sphere having a Krumbein sphericity of at least about 0.8 and a roundness of at least about 0.8, and the proppant having a Krumbein sphericity of at least about 0.8 and a roundness of at least about 0.8, and a continuous sintered shell around the entire outer surface of the template sphere, wherein at least the outer surface of the template sphere comprises a glass-ceramic or a glass-ceramic containing layer in contact with the outer surface of the template sphere. In general, the template sphere can be a solid sphere, or a hollow sphere. The proppant can comprise a continuous sintered shell around the entire outer surface of the template sphere or the glass-ceramic containing layer, and the shell can comprise a ceramic material or oxide thereof. The template sphere can be entirely glass-ceramic. The template sphere can be a cenosphere. The template sphere can comprise ceramic and/or glass. The template sphere can comprise glass. The proppant can comprise a glass-ceramic containing layer that is in contact with the template sphere, and the glass-ceramic containing layer can comprise a glass-ceramic which at least partially diffuses into the outer surface of the template sphere. The proppant can have an outer surface that has a thickness of from about 0.1 μm to about 1000 μm. The glass-ceramic can have a degree of crystallinity of from about 1% to about 100%, or from about 60% to about 80%. The glass-ceramic can comprise crystallites having an orientation that is random. The glass-ceramic can comprise crystallites having an orientation that is non-random. The glass-ceramic can be capable of withstanding temperatures of up to about 800° C. to 1,500° C.

In general, the proppant can have at least one of the following properties:
a) the template sphere has a coefficient of thermal expansion (CTE at from 25° C. to 300° C.) of from $0.1 \times 10^{-6}$/K to $13 \times 10^{-6}$/K; and/or
b) the shell has a coefficient of thermal expansion (CTE at from 25° C. to 300° C.) of from $0.1 \times 10^{-6}$/K to $13 \times 10^{-6}$/K.

In general, the proppant can have a specific gravity of about 3 or less; and/or a coefficient of thermal expansion (CTE at from 25° C. to 300° C.) of from about $0.1 \times 10^{-6}$/K to about $13 \times 10^{-6}$/K; and/or a thermal conductivity of from about 0.01 W/m-K to about 3.0 W/m-K.

In general, the proppant or a component thereof can have at least one of the following properties: a density of from about 1.5 to about 3.5 g/cm$^3$; a Young's Modulus of from about 50 to about 80 GPa; and/or a MOR of from about 50 to about 150 MPa. The proppant or template sphere can have a MOR of from about 1 to about 100 MPa. The proppant or a component thereof can have at least one of the following properties:
a) shear modulus (at 20° C.) of from about 20 to about 50 GPa;
b) a modulus of rupture (at 30° C.) of from about 50 to about 150 MPa;
c) a compressive strength of from about 300 MPa to about 500 MPa;
d) a fracture toughness of from about 1 to about 10 MPa·m$^{1/2}$; or
e) a thermal conductivity of from about 0.01 to about 3 W/(m·K).

The proppant can have a continuous shell having a thickness of from about 5 micrometers to 1000 micrometers, and a template sphere having a specific gravity of from about 0.2 to about 3, and the proppant can have a crush strength of about 1,000 psi or greater, and the template sphere can have a void volume % of at least 30%.

The proppant or template sphere can comprise a mixture of aluminum oxide, silicon oxide, titanium oxide, iron oxide, magnesium oxide, calcium oxide, potassium oxide and sodium oxide. The proppant or template sphere can comprise aluminum oxide, silicon oxide, boron oxide, potassium oxide, zirconium oxide, magnesium oxide, calcium oxide, titanium oxide or any combination thereof.

The proppant or template sphere can comprise from about 10% to about 55% by weight $SiO_2$; from about 0% to about 28% by weight $Al_2O_3$; from about 1% to about 5% by weight CaO; from about 7% to about 50% by weight MgO; from about 0.5% to about 25% by weight $TiO_2$; from about 0.4% to about 30% by weight $B_2O_3$, and greater than 0% and up to about 5% by weight $P_2O_5$, based on the weight of the glass-ceramic. The proppant or template sphere can comprise from about 3% to about 10% by weight $Li_2O$; from about 0% to about 28% by weight $Al_2O_3$; from about 10% to about 55% by weight $SiO_2$; from about 7% to about 50% by weight MgO; from about 0.5% to about 25% by weight $TiO_2$; from about 0.4% to about 30% by weight $B_2O_3$, and from about 6% to about 20% by weight ZnO, based on the weight of the glass-ceramic.

The proppant or shell (if present) can comprise aluminum oxide, silicon oxide, boron oxide, potassium oxide, zirconium oxide, magnesium oxide, calcium oxide, lithium oxide, sodium oxide, iron oxide, phosphorous oxide, and/or titanium oxide or any combination thereof.

The proppant or shell (if present) can comprise silicon oxide, sodium oxide, potassium oxide, calcium oxide, zirconium oxide, aluminum oxide, lithium oxide, iron oxide, cordierite, spinel, spodumene, steatite, a silicate, a substituted aluminosilicate clay or any combination thereof.

The proppant or shell (if present) can comprise Steatite. The proppant or shell (if present) can comprise cordierite.

The proppant or shell (if present) can comprise magnesium oxide, calcium oxide, cerium oxide, yttrium oxide, scandium oxide, titanium dioxide, or any combination thereof.

The proppant or shell (if present) can comprise a metal oxide, a metal carbide, a metal nitride, a metal boride, a metal silicide or any combination thereof, derived from a silicon source, titanium source, tungsten source, zirconium source, aluminum source, boron source, or any combination thereof.

The proppant or shell (if present) can be surface modified by applying at least one organic material to the shell.

The glass-ceramic can be uniformly distributed in the continuous sintered shell and/or the template sphere. The glass-ceramic can be non-uniformly distributed in the continuous sintered shell and/or the template sphere.

The crystallite size of the glass-ceramic can be from about 0.1 to about 0.5 micrometers. The crystallite size of the glass-ceramic can be less than 1 micron. The proppant can be spherical, rod-, pillar-, spike-, gear-, donut-, cylinder-, polygon- or peanut-shaped. The proppant can comprise a shape having an aspect ratio of 1.

The proppant can comprise a glass-ceramic containing layer that is in contact with a template sphere, and, optionally, the glass-ceramic containing layer can comprise a glass-ceramic which at least partially diffuses into the outer surface of a template sphere. The proppant can have an outer surface or layer having a thickness of from about 0.1 to about 1000 μm. The glass-ceramic can comprise from about 1% to about 100% crystallinity, such as from about 10% to about 100% crystallinity.

The proppant can be a microsphere and/or pore containing ceramic particle comprising a sintered body having a plurality of microspheres and/or pores contained therein, and wherein the microspheres and/or pores are optionally at least partially surrounded by at least one glassy compound, and a majority of said gas microspheres and/or pores are not in contact with each other. The sintered body can comprise at least in part cordierite, mullite, bauxite, silica, spodumene, silicon oxide, aluminum oxide, sodium oxide, potassium oxide, calcium oxide, zirconium oxide, lithium oxide, iron oxide, spinet steatite, a silicate, a substituted alumino silicate clay, an inorganic nitride, an inorganic carbide, a non-oxide ceramic or any combination thereof. The sintered body can surround or encapsulate a cenosphere, a micro glass bead, a synthetic cenosphere, a polymer bead or any combination thereof. The microsphere and/or pore containing ceramic particle can have a specific gravity of from about 0.8 to about 3.5, a microsphere and/or pore total volume of from about 1% to about 49%, a crush strength of from about 4500 psi to about 30000 psi, and a four point bending strength of about 7000 psi to about 58000 psi. The microsphere and/or pore containing ceramic particle can have a specific gravity of from about 1.5 to about 3.2, a microsphere and/or pore total volume of from about 1% to about 30%, a crush strength of from 4500 psi to about 30000 psi, and a four point bending strength of about 7000 psi to about 58000 psi.

The microsphere and/or pore containing ceramic particle can have an $R_p$ of from about 0.01 to about 0.1, wherein $R_p=d_{v50}/d_{p50}$ wherein $d_{v50}$ is a median microsphere and/or pore size where 50% of the microspheres and/or pores of the distribution has a smaller microsphere and/or pore size and $d_{p50}$ is a median particle size where 50% of the particles of the distribution have a smaller particle size.

The proppant can have in situ formed microspheres and/or pores that contain whiskers or fibers. The sintered body can contain whiskers or fibers. The interface between the sintered body and the microspheres can contain whiskers or fibers.

The proppant can have one or more of the following characteristics:
a) a majority of pores and/or microspheres in the proppant (excluding any optional central void) have a size of less than 50 cubic microns,
b) a population of proppants (based on a 50 gram sample of proppants) have a specific gravity variance of ±0.05 or less,
c) a total porosity of 1% to 30% by volume of proppant (excluding any optional central void), wherein a majority of the pores/microspheres are not in contact with each other, and/or
d) the pores/microspheres are uniformly distributed in the proppant such that the pore/microsphere density is about the same throughout the proppant.

The majority can be 1% to 30% based on a count of total pores/microspheres present in the proppant excluding any central voids optionally present.

The proppant can have a pore/microsphere density such that a sector of the proppant has a density of within ±10% compared to a different sector of the proppant.

The proppant (or population of proppant) can have a specific gravity variance of ±0.05 or less.

The proppant can comprise a sintered body, wherein the sintered body comprises preformed and/or in-situ whiskers and at least one amorphous phase. The proppant can comprise at least one non-whisker containing crystalline phase. The non-whisker containing crystalline phase can comprise at least one crystalline particulate phase. The non-whisker containing crystalline phase can comprise alumina. The non-whisker containing crystalline phase can comprise from about 10 wt % to about 75 wt %, based on the total weight of the proppant. The non-whisker containing crystalline phase can comprise from about 50 wt % to about 70 wt %, based on the total weight of the proppant.

The proppant can have the following characteristics:
mullite phase: 5 wt % to 40 wt %
overall crystalline phase: 10 wt % to 75 wt %
overall amorphous phase: 5 wt % to 50 wt %
quartz phase: 0% to 5%
cristobalite phase: 0 wt % to 5 wt %;
all based on the wt % of said proppant.
The proppant can have the following characteristics:
mullite phase: 10 wt % to 30 wt %
overall crystalline phase: 35 wt % to 75 wt %
overall amorphous phase: 7 wt % to 35 wt %
quartz phase: 0% to 3%
cristobalite phase: 0 wt % to 3 wt %;
all based on the wt % of said proppant.
The proppant can have the following characteristics:
mullite phase: 15 wt % to 30 wt %
overall crystalline phase: 40 wt % to 75 wt %
overall amorphous phase: 10 wt % to 30 wt %
quartz phase: 0% to 1.5%
cristobalite phase: 0 wt % to 1.5 wt %;
all based on the wt % of said proppant.
The proppant can have the following characteristics:
mullite phase: 15 wt % to 30 wt %
overall crystalline phase: 50 wt % to 75 wt %
overall amorphous phase: 15 wt % to 30 wt %
quartz phase: 0% to 1.5%
cristobalite phase: 0 wt % to 3 wt %;
all based on the wt % of said proppant.

The proppant can have the following characteristics:
mullite phase: 15 wt % to 30 wt %
overall crystalline phase: 50 wt % to 65 wt %
overall amorphous phase: 15 wt % to 30 wt %
quartz phase: 0% to 1.5%
cristobalite phase: 0 wt % to 3 wt %;
all based on the wt % of said proppant.

The in-situ whiskers can be present as an in-situ whisker phase that is a continuous phase.

The in-situ whiskers can be present as an in-situ whisker phase that is a non-continuous phase.

The in-situ whiskers can be uniformly distributed throughout the sintered body. The in-situ whiskers are present in said sintered body in a three-dimensional non-woven structure. The in-situ whiskers have a phase connectivity of 3. The in-situ whiskers have a phase connectivity of 2. The in-situ whiskers can be metal oxide or mineral derived in-situ whiskers.

A template (if present) can comprise in-situ whiskers and at least one amorphous phase. A template (if present) can comprise at least one non-whisker containing crystalline phase.

The template can comprise in-situ whiskers and at least one amorphous phase wherein concentration of in-situ whiskers in the template is different from the concentration of in-situ whiskers in the sintered body that is on the template. The template can comprise in-situ whiskers and at least one amorphous phase wherein concentration of in-situ whiskers in the template is lower than the concentration of in-situ whiskers in the sintered body that is on the template.

The in-situ whiskers can comprise mineral or metal oxide derived whiskers.

The proppant can have at least one of the following characteristics:
a. an overall diameter of from about 90 microns to about 2,000 microns;
b. a Krumbein sphericity of at least about 0.5 and a roundness of at least about 0.5;
c. a crush strength of about 10 MPa or greater;
d. a specific gravity of from about 1.0 to about 3.0;
e. a porosity of from about 6% to about 40%;
f. at least 90% of proppant pores having a pore size of from about 0.1 µm to about 10 µm, and
g. at least 80% of proppant pores are not in contact with each other.

The proppant can comprise a sintered body having at least one mullite whisker phase and at least one amorphous phase.

The proppant can further comprise at least one non-whisker containing crystalline phase.

The amorphous phase can be a ceramics comprising alumina, silica, or any combination thereof.

The amorphous phase can comprise unreacted particles of alumina, alumina precursor, siliceous material or any combination thereof.

In general, the proppant can include a template that is a hollow sphere comprising a cenosphere, a solid sphere, a micro glass sphere, a synthetic cenosphere, a polymer bead, or any combination thereof.

The mullite whiskers can have diameters of from about 0.05 µm to about 2 µm, aspect ratios from about 10 to about 50, and/or lengths from about 1 µm to about 50 µm.

The phases of the proppant can comprise 3-3 connectivity for the mullite whisker phase and the amorphous phase, or can comprise 3-3-0 connectivity for the mullite whisker phase, the amorphous phase and the unreacted alumina or alumna precursor, or can comprise 3-3-0 connectivity among the mullite whisker phase, the amorphous phase and the unreacted alumina or alumna precursor, or can comprise 3-3-0-0 connectivity for the mullite whisker phase, the amorphous phase, the unreacted alumina material and the unreacted siliceous material.

The proppant can comprise a sintered body, wherein the sintered body comprises in-situ whiskers, at least one glassy phase, and at least one amorphous phase. The sintered body can further comprise at least one non-whisker containing crystalline phase. The sintered body can further comprise at least one carbide or metal carbide. The at least one carbide can be SiC. The carbide or metal carbide can be present in an amount of from 1% by weight to 25% by weight, based on the weight of the proppant.

The proppant can comprise at least one carbide or metal carbide in particulate form, and at least one non-whisker containing crystalline particulate phase. The at least one non-whisker containing crystalline particulate phase can be alumina. The in-situ whiskers can be present as an in-situ whisker phase that is a continuous phase. The in-situ whiskers can be present as an in-situ whisker phase that is a non-continuous phase. The in-situ whiskers can be uniformly distributed throughout the sintered body.

The proppant can comprise a sintered sphere having a Krumbein sphericity of at least about 0.8 and a roundness of at least about 0.4, and wherein the sphere comprises a) a plurality of ceramic whiskers or oxides thereof and b) a glassy phase or amorphous phase and c) optionally at least one non-whisker crystalline phase and d) optionally a plurality of microspheres, wherein the sintered sphere has a diameter of from about 90 microns to 2,500 microns, and the sintered sphere has a specific gravity of from 0.8 to about 3.8, and the proppant has a crush strength of from about 1,000 psi or greater, and wherein the proppant includes one or more of the following characteristics:

1) said glassy phase is present in an amount of at least 10% by weight, based on the weight of the proppant;
2) said ceramic whiskers have an average length of less than 3.2 microns;
3) said ceramic whisker have an average width of less than 0.35 micron;
4) said ceramic whiskers have a whisker length distribution, $d_{as}$, of about 8 or less, wherein, $d_{as}=\{(d_{a90}-d_{a10})/d_{a50}\}$ wherein $d_{a10}$ is a whisker length wherein 10% of the whiskers have a smaller length, $d_{a50}$ is a median whisker length wherein 50% of the whiskers have a smaller whisker length, and $d_{a90}$ is a whisker length wherein 90% of the whiskers have a smaller whisker length;
5) said proppant having a specific gravity of from 1.6 to 1.8 with a crush strength of at least 2000 psi;
6) said proppant having a specific gravity of from 1.8 to 2 with a crush strength of at least 3000 psi;
7) said proppant having a specific gravity of from 2 to 2.1 with a crush strength of at least 5,000 psi;
8) said proppant having a specific gravity of from 2.25 to 2.35 with a crush strength of at least 8,000 psi;
9) said proppant having a specific gravity of from 2.5 to 3.2 with a crush strength of at least 12,000 psi;
10) said proppant having a specific gravity of from 2.5 to 3.2 with a crush strength of at least 18,000 psi;
11) said proppant having a combined clay amount and cristobalite amount of less than 20% by weight of proppant;
12) said proppant having an free alpha-alumina content of at least 5% by weight of said proppant;
13) said proppant having an API-certified 12% HCl+3% HF etching weight loss of less than 7% by weight of said proppant;

14) said proppant having said microspheres present as hollow glass microspheres having a particle size distribution, $d_{as}$, of from about 0.5 to about 2.7, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size;
15) said proppant having microspheres present wherein said microspheres are uniformly present in said proppant or in a layered region of said proppant;
16) said ceramic whiskers are present in an amount of from 5% to 60% by weight of said proppant.
17) said proppant has a combined quartz amount and cristobalite amount of less than 20% by weight of proppant and said mullite whiskers are present in an amount of 60% or more by weight of said proppant;
18) said proppant has a high whisker distribution density based on individual whiskers present in the proppant (# of whiskers per mg of proppant);
19) said proppant has a unimodal whisker distribution;
20) said proppant has at least two layers that form a laminate structure;
21) said proppant has at least a first layer and a second layer that form a laminate structure wherein the average length of said whiskers in said first layer compared to said second layer is different;
22) said proppant has at least a first layer and a second layer that form a laminate structure wherein the average width of said whiskers in said first layer compared to said second layer is different;
23) said whiskers in said proppant are less euhedral and more anhedral;
24) said proppant has at least one radial region of first whiskers and at least one region of second whiskers, wherein the average whisker length is different by at least 10%;
25) said proppant has at least one radial region of first whiskers and at least one region of second whiskers, wherein the average whisker width is different by at least 10%;
26) said proppant has a major phase of whiskers of less than one micron and a secondary minor phase of whiskers of one micron or higher; and/or
27) said ceramic whiskers have a whisker length distribution having $d_{a90}$, which is a whisker length wherein 90% of the whiskers have a smaller whisker length, of less than 12 microns.

The proppant can comprise a sintered body, wherein the sintered body comprises at least one crystalline phase, at least one amorphous phase, and substantially spherical microspheres and/or pores uniformly distributed in said sintered body.

The proppant can comprise a sintered sphere having a Krumbein sphericity of at least about 0.8 and a roundness of at least about 0.4, and wherein said sphere comprises a) at least one crystalline phase and b) at least one amorphous phase, c) a plurality of microspheres and, optionally, d) ceramic whiskers, wherein said sintered sphere has a diameter of from about 90 microns to 2,500 microns, and said sintered sphere has a specific gravity of from 0.8 to about 3.8, and said proppant has a crush strength of from about 1,000 psi or greater, and wherein said proppant includes one or more of the following characteristics:
1) said crystalline phase is present in an amount of at least 30% by weight, based on the weight of the proppant;
2) said amorphous phase is present in an amount of at least 10% by weight, based on the weight of the proppant;
3) said proppant having a porosity from about 1% to 40% by weight where $$\text{porosity (\%)} = 100 - \left(\frac{SG_m}{SG_t}\right) \times 100$$

and
$SG_m$=measured specific gravity and
$SG_t$=theoretical specific gravity;
4) said proppant having a porosity from about 5% to 30% by weight;
5) said proppant having a porosity from about 3% to 20% by weight;
6) said proppant having a porosity from about 4% to 16% by weight;
7) said proppant having a specific gravity of from 1.6 to 1.8 with a crush strength of at least 2000 psi;
8) said proppant having a specific gravity of from 1.8 to 2 with a crush strength of at least 3000 psi;
9) said proppant having a specific gravity of from 2 to 2.1 with a crush strength of at least 5,000 psi;
10) said proppant having a specific gravity of from 2.25 to 2.35 with a crush strength of at least 8,000 psi;
11) said proppant having a specific gravity of from 2.5 to 3.2 with a crush strength of at least 18,000 psi;
12) said proppant having a specific gravity of from 2.5 to 3.2 with a crush strength of at least 25,000 psi;
13) said proppant having a combined clay amount and cristobalite amount of less than 20% by weight of proppant;
14) said proppant having a free alpha-alumina content of at least 5% by weight of said proppant;
15) said proppant having an HF etching weight loss of less than 35% by weight of said proppant;
16) said proppant having said microspheres present as hollow glass microspheres having a particle size distribution, $d_{as}$, of from about 0.5 to about 2.7, wherein, $d_{as}=\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size;
17) said proppant having microspheres present wherein said microspheres are uniformly present in said proppant or in a layered region of said proppant;
18) said optional ceramic whiskers have an average length of less than 5 microns;
19) said optional ceramic whisker have an average width of less than 0.35 micron;
20) said optional ceramic whiskers have a whisker length distribution, $d_{as}$, of about 8 or less, wherein, $d_{as}=\{(d_{a90}-d_{a10})/d_{a50}\}$ wherein $d_{a10}$ is a whisker length wherein 10% of the whiskers have a smaller length, $d_{a50}$ is a median whisker length wherein 50% of the whiskers have a smaller whisker length, and $d_{a90}$ is a whisker length wherein 90% of the whiskers have a smaller whisker length;
21) said optional ceramic whiskers are present in an amount of from 5% to 60% by weight of said proppant;
22) said proppant has a combined clay amount and cristobalite amount of less than 20% by weight of proppant and said mullite whiskers are present in an amount of 60% or more by weight of said proppant;
23) said proppant has a uniform composition comprised of both crystalline and amorphous materials that extend from the inner portions of the proppant out through the surface; and/or,
24) said whiskers in said proppant are less euhedral and more anhedral.

A proppant formulation can comprise a proppant and a carrier. The present invention further relates to a method to prop open subterranean formation fractions comprising introducing the proppant formulation to the subterranean formation. The present invention further relates to a method of treating a subterranean producing zone penetrated by a well bore comprising the steps of: (a) preparing or providing a treating fluid that comprises a fluid, energized fluid, foam, or a gas carrier having the proppant suspended therein, and (b) pumping the treating fluid into the subterranean producing zone whereby the particles are deposited therein. The treating fluid can be a fracturing fluid and the proppant is deposited in fractures formed in the subterranean producing zone. The treating fluid can be a gravel packing fluid and the proppant can be deposited in the well bore adjacent to the subterranean producing zone.

The present invention further relates to a method of treating a subterranean producing zone penetrated by a well bore comprising the steps of: (a) preparing or providing a treating fluid that comprises a fluid, energized fluid, foam or gas carrier having the proppant suspended therein, and (b) pumping the treating fluid into the subterranean producing zone whereby the particles are deposited therein.

In the present invention, one or more proppants of the present invention can be used alone or in a formulation to prop open subterranean formation fractions by introducing the proppant formulation into the subterranean formation such as by pumping or other introduction means known to those skilled in the art. An example of a well completion operation using a treating fluid containing proppants or particles is gravel packing. In gravel packing operations, particles referred to in the art as gravel are carried to a subterranean producing zone in which a gravel pack is to be placed by a hydrocarbon or water carrying fluid (or other carrier source, such as a fluid, energized fluid, foam, gas, and the like). That is, the particles are suspended in the carrier fluid which can be viscosified and the carrier fluid is pumped into the subterranean producing zone in which a gravel pack is to be placed. Once the particles are placed in the zone, the treating fluid leaks off into the subterranean zone and/or is returned to the surface. The gravel pack produced functions as a filter to separate formation solids from produced fluids while permitting the produced fluids to flow into and through the well bore. An example of a production stimulation treatment utilizing a treating fluid having particles suspended therein is hydraulic fracturing. That is, a treating fluid, referred to in the art as a fracturing fluid, is pumped through a well bore into a subterranean zone to be stimulated at a rate and pressure such that fractures are formed and extended into the subterranean zone. At least a portion of the fracturing fluid carries particles, referred to in the art as proppant particles into the formed fractures. The particles are deposited in the fractures and the fracturing fluid leaks off into the subterranean zone and/or is returned to the surface. The particles function to prevent the formed fractures from closing whereby conductive channels are formed through which produced fluids can flow to the well bore.

While the term proppant has been used to identify the preferred use of the materials of the present invention, it is to be understood that the materials of the present invention can be used in other applications, such as medical applications, filtration, polymeric applications, catalysts, rubber applications, filler applications, drug delivery, pharmaceutical applications, and the like.

U.S. Pat. Nos. 4,547,468; 6,632,527 B1; 4,493,875; 5,212,143; 4,777,154; 4,637,990; 4,671,909; 5,397,759; 5,225,123; 4,743,545; 4,415,512; 4,303,432; 4,303,433; 4,303,431; 4,303,730; and 4,303,736 relating to the use of proppants, conventional components, formulations, and the like can be used with the proppants of the present invention, and are incorporated in their entirety by reference herein. The processes described in AMERICAN CERAMIC SOCIETY BULLETIN, Vol. 85, No. 1, January 2006, and U.S. Pat. Nos. 6,528,446; 4,725,390; 6,197,073; 5,472,648; 5,420,086; and 5,183,493, and U.S. Patent Application Publication No. 2004/0012105 can be used herein and is incorporated in its entirety herein. The proppant can be a synthetic proppant, like a synthetic cenosphere template, with any shell.

The present invention includes the following aspects/embodiments/features in any order and/or in any combination:

1. The present invention relates to a proppant having low surface friction comprising an angle of repose of 30° or less.
2. The proppant of any preceding or following embodiment/feature/aspect, wherein said angle of repose is 15° to 30°.
3. The proppant of any preceding or following embodiment/feature/aspect, wherein said angle of repose is 15° to 22°.
4. The proppant of any preceding or following embodiment/feature/aspect, wherein said angle of repose is 20° to 25°.
5. The proppant of any preceding or following embodiment/feature/aspect, wherein said proppant comprises one or more ceramic materials.
6. The proppant of any preceding or following embodiment/feature/aspect, wherein said proppant is a ceramic proppant.
7. The proppant of any preceding or following embodiment/feature/aspect, wherein said proppant comprises a template sphere and a shell that encompasses the template sphere.
8. The proppant of any preceding or following embodiment/feature/aspect, wherein said proppant has a Krumbein sphericity of at least 0.9 and a roundness of at least 0.8.
9. The proppant of any preceding or following embodiment/feature/aspect, wherein said proppant has a tight particle size distribution such that the proppant has a $d_{ps}$ from about 0.001 to about 0.4, wherein $d_{ps}=(d_{p90}-d_{p10})/d_{p50}$ and wherein $d_{p10}$ is a particle size (or proppant size) wherein 10% of the particles have a smaller particle size, $d_{p50}$ is a median particle size wherein 50% of the particles have a smaller particle size, and $d_{p90}$ is a particle size wherein 90% of the particles have a smaller particle size.
10. The proppant of any preceding or following embodiment/feature/aspect, wherein said proppant has a particle size of from 100 microns to about 2000 microns.
11. The proppant of any preceding or following embodiment/feature/aspect, wherein said proppant has a crush strength of 1000 psi or greater.
12. The proppant of any preceding or following embodiment/feature/aspect, wherein said proppant has a crush strength of 5000 psi or greater.

13. The proppant of any preceding or following embodiment/feature/aspect, wherein said proppant has a specific gravity of from about 0.6 to about 2.5.

14. The proppant of any preceding or following embodiment/feature/aspect, wherein said proppant further comprises:
   a) a Krumbein sphericity of at least 0.9;
   b) a roundness of at least 0.8;
   c) a particle size distribution such that the proppant has a $d_{ps}$ from about 0.001 to about 0.4, wherein $d_{ps}=(d_{p90}-d_{p10})/d_{p50}$ and wherein $d_{p10}$ is a particle size (or proppant size) wherein 10% of the particles have a smaller particle size, $d_{p50}$ is a median particle size wherein 50% of the particles have a smaller particle size, and $d_{p90}$ is a particle size wherein 90% of the particles have a smaller particle size;
   d) a particle size of from 100 microns to 2000 microns;
   e) a crush strength of at least 3000 psi; and
   f) a specific gravity of from about 0.6 to about 2.5.

15. The proppant of any preceding or following embodiment/feature/aspect, further comprising at least one lubricant layer.

16. The proppant of any preceding or following embodiment/feature/aspect, wherein said lubricant layer comprises graphite, molybdenum, disulphide, boron nitride, tungsten disulphide, hexagonal boron nitrite, or any other solid material with a lamellar-type crystal structure, or any combination thereof.

17. The proppant of any preceding or following embodiment/feature/aspect, wherein said lubricant layer comprises carbon particles.

18. A method for selecting a proppant comprising measuring the angle of repose of the proppant and selecting said proppant if the angle of repose is 30° or less.

19. A method to obtain slow settling velocity of the proppant in a transport fluid or carrying fluid comprising utilizing a proppant having an angle of repose of 30° or less.

20. A method for achieving a lower agglomeration of proppant comprising utilizing a proppant having an angle of repose of 30° or less.

21. A method of achieving lower resistance to multi-phase flow in a subterranean formation comprising utilizing a proppant having an angle of repose of 30° or less.

22. A method to achieve lower pressure drop in a subterranean formation comprising utilizing a proppant having an angle of repose of 30° or less.

23. A method to reduce bridging and/or clogging of the proppant in a subterranean formation comprising utilizing a proppant having an angle of repose of 30° or less.

24. A proppant formulation comprising the proppant of any preceding or following embodiment/feature/aspect in at least one carrier.

25. A method to prop open subterranean formation fractures comprising introducing the proppant formulation of any preceding or following embodiment/feature/aspect into the subterranean formation.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A proppant having low surface friction comprising an angle of repose of 30° or less; wherein said proppant comprises:
   a) a Krumbein sphericity of at least 0.5;
   b) a roundness of at least 0.5;
   c) a particle size distribution such that the proppant has a $d_{ps}$ from about 0.001 to about 0.3, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size;
   d) a porosity, excluding a central void, of from about 6% to about 40%; and
   e) proppant pores, wherein at least 90% of the proppant pores have a pore size of from about 0.1 micron to about 10 microns and at least 80% of the proppant pores are not in contact with each other.

2. The proppant of claim 1, wherein said angle of repose is 15° to 30°.

3. The proppant of claim 1, wherein said angle of repose is 15° to 22°.

4. The proppant of claim 1, wherein said angle of repose is 20° to 25°.

5. The proppant of claim 1, wherein said proppant comprises one or more ceramic materials.

6. The proppant of claim 1, wherein said proppant is a ceramic proppant.

7. The proppant of claim 1, wherein said proppant has a Krumbein sphericity of at least 0.9 and a roundness of at least 0.9.

8. The proppant of claim 1, wherein said proppant has a tight particle size distribution such that the proppant has a $d_{ps}$ from about 0.075 to about 0.3, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size.

9. The proppant of claim 1, wherein said proppant has a particle size of from 200 microns to about 2000 microns.

10. The proppant of claim 1, wherein said proppant has a crush strength of 10,000 psi or greater.

11. The proppant of claim 1, wherein said proppant has a crush strength of 5000 psi or greater.

12. The proppant of claim 1, wherein said proppant has a specific gravity of from about 1.0 to about 2.5.

13. The proppant of claim 1, further comprising at least one lubricant layer.

14. The proppant of claim 13, wherein said lubricant layer comprises graphite, molybdenum, disulphide, boron nitride, tungsten disulphide, hexagonal boron nitride, or any other solid material with a lamellar-type crystal structure, or any combination thereof.

15. The proppant of claim 13, wherein said lubricant layer comprises carbon particles.

16. A method comprising:
manufacturing a proppant; and
measuring the angle of repose of the proppant, wherein said proppant comprises:
a) a Krumbein sphericity of at least 0.5:
b) a roundness of at least 0.5;
c) a particle size distribution such that the proppant has a d from about 0.001 to about 0.3, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size;
d) a porosity, excluding a central void, of from about 6% to about 40%; and
e) proppant pores, wherein at least 90% of the proppant pores have a pore size of from about 0.1 micron to about 10 microns and at least 80% of the proppant pores are not in contact with each other.

17. A method comprising:
manufacturing a proppant having an angle of repose of 30° or less; and
placing the proppant in a transport fluid or carrying fluid, wherein said proppant comprises:
a) a Krumbein sphericity of at least 0.5;
b) a roundness of at least 0.5;
c) a particle size distribution such that the proppant has a $d_{ps}$ from about 0.001 to about 0.3, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size;
d) a porosity, excluding a central void, of from about 6% to about 40%; and
e) proppant pores, wherein at least 90% of the proppant pores have a pore size of from about 0.1 micron to about 10 microns and at least 80% of the proppant pores are not in contact with each other.

18. A method comprising:
manufacturing a first proppant having an angle of repose of 30° or less, wherein the first proppant comprises a ceramic material;
measuring the agglomeration of the first proppant in a treatment fluid; wherein the first proppant has less agglomeration relative to a second proppant having an angle of repose greater than 30° and comprising the same ceramic material as the first proppant, wherein said first proppant comprises:
a) a Krumbein sphericity of at least 0.5;
b) a roundness of at least 0.5;
c) a particle size distribution such that the proppant has a d from about 0.001 to about 0.3, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size;
d) a porosity, excluding a central void, of from about 6% to about 40%; and
e) proppant pores, wherein at least 90% of the proppant pores have a pore size of from about 0.1 micron to about 10 microns and at least 80% of the proppant pores are not in contact with each other.

19. A method of achieving lower resistance to multi-phase flow in a subterranean formation comprising:
introducing a proppant having an angle of repose of 30° or less into the subterranean formation such that the resistance to multi-phase flow in the subterranean formation is lowered; wherein said proppant comprises:
a) a Krumbein sphericity of at least 0.5;
b) a roundness of at least 0.5;
c) a particle size distribution such that the proppant has a $d_{ps}$ from about 0.001 to about 0.3, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size;
d) a porosity, excluding a central void, of from about 6% to about 40%; and
e) proppant pores, wherein at least 90% of the proppant pores have a pore size of from about 0.1 micron to about 10 microns and at least 80% of the proppant pores ores are not in contact with each other.

20. A method to achieve lower pressure drop in a subterranean formation comprising:
introducing a proppant having an angle of repose of 30° or less into the subterranean formation such that the pressure drop in the subterranean formation is lowered; wherein said proppant comprises:
a) a Krumbein sphericity of at least 0.5;
b) a roundness of at least 0.5:
c) a particle size distribution such that the proppant has a $d_{ps}$ from about 0.001 to about 0.3, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size;
d) a porosity, excluding a central void, of from about 6% to about 40%; and
e) proppant pores, wherein at least 90% of the proppant pores have a pore size of from about 0.1 micron to about 10 microns and at least 80% of the proppant pores are not in contact with each other.

21. A method to reduce bridging and/or clogging of the proppant in a subterranean formation comprising:
introducing a proppant having an angle of repose of 30° or less into the subterranean formation such that the bridging and/or clogging, of the proppant in the subterranean formation is reduced; wherein said proppant further comprises:
a) a Krumbein sphericity of at least 0.5;
b) a roundness of at least 0.5:
c) a particle size distribution such that the proppant has a $d_{ps}$ from about 0.001 to about 0.3, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size;
d) a porosity, excluding a central void, of from about 6% to about 40%; and e) proppant pores, wherein at least 90% of the proppant pores have a pore size of from about 0.1 micron to about 10 microns and at least 80% of the proppant pores are not in contact with each other.

22. A proppant formulation comprising the proppant of claim 1 in at least one carrier.

23. A method to prop open subterranean formation fractures comprising introducing the proppant formulation of claim 22 into the subterranean formation.

24. The proppant of claim 1, wherein the proppant has a $d_{ps}$ from about 0.001 to about 0.25.

25. The proppant of claim 1, wherein the proppant has a from from about 0.001 to about 0.01.

26. The proppant of claim 1, wherein the proppant comprises a template shell and a shell that encompasses the template sphere.

* * * * *